United States Patent

Sonehara et al.

[11] Patent Number: 5,555,171
[45] Date of Patent: Sep. 10, 1996

[54] DATA COLLECTION SYSTEM FOR DRIVING MACHINE

[75] Inventors: Hiroshi Sonehara; Akira Toba, both of Sagamihara; Shuki Akushichi; Yoshiyuki Shitaya, both of Hiratsuka, all of Japan

[73] Assignee: Kabushiki Kaisha Komatsu Seisakusho, Tokyo, Japan

[21] Appl. No.: 271,490

[22] Filed: Jul. 7, 1994

[30] Foreign Application Priority Data

Jul. 8, 1993 [JP] Japan ................................. 5-169235

[51] Int. Cl.⁶ ........................................... G06F 17/40
[52] U.S. Cl. .............................. 364/424.03; 364/551.01; 340/425.5; 371/20.6
[58] Field of Search ................. 364/424.01, 424.03, 364/424.04, 424.05, 550, 550.01; 340/438, 459, 425.5; 371/15.1, 29.1, 20.6

[56] References Cited

U.S. PATENT DOCUMENTS

| | | | |
|---|---|---|---|
| 4,843,557 | 6/1989 | Ina et al. | 340/459 |
| 4,894,781 | 1/1990 | Sato et al. | 364/551.01 |
| 4,924,391 | 5/1990 | Hirano et al. | 364/424.03 |
| 5,132,905 | 7/1992 | Takai et al. | 364/424.03 |
| 5,189,617 | 2/1993 | Shirashi | 364/424.05 |
| 5,313,388 | 5/1994 | Cortis | 364/424.04 |
| 5,333,163 | 4/1994 | Ebaugh et al. | 364/550 |
| 5,345,384 | 9/1994 | Przbyla et al. | 364/424.04 |
| 5,365,436 | 11/1994 | Schaller et al. | 364/424.03 |

*Primary Examiner*—Collin W. Park
*Attorney, Agent, or Firm*—Diller, Ramik & Wight, PC

[57] ABSTRACT

A data collection system for a driving machine for collecting data obtained at a plurality of controllers disposed within the driving machine, in which one of the plurality of controllers is used as a master controller to perform sequential polling operation over the other controllers including an external controller through a communication line. The other controller subjected to the polling transmits data obtained at its own controller to the controllers other than its own controller. The master controller continues its polling operation so long as the master controller fails to receive a response to the polling from the external controller. The master controller, when receiving the response to the polling from the external controller, judges that the external controller was connected to a connector for connection with the external controller and stops its polling operation. The external controller responded to the polling, after responding to the polling, perform sequential polling operation over the other controllers and collects data obtained at the other controllers in place of the master controller.

6 Claims, 7 Drawing Sheets

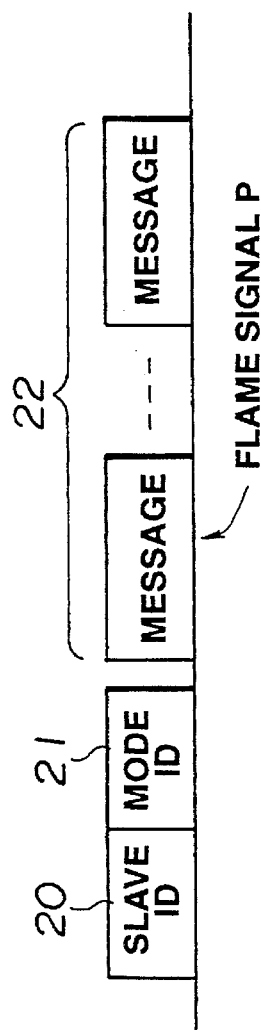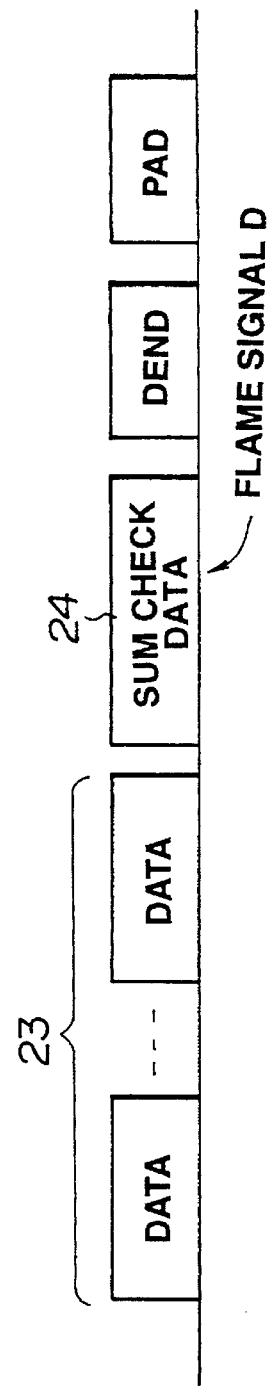
FIG.6(a)  FIG.6(b)

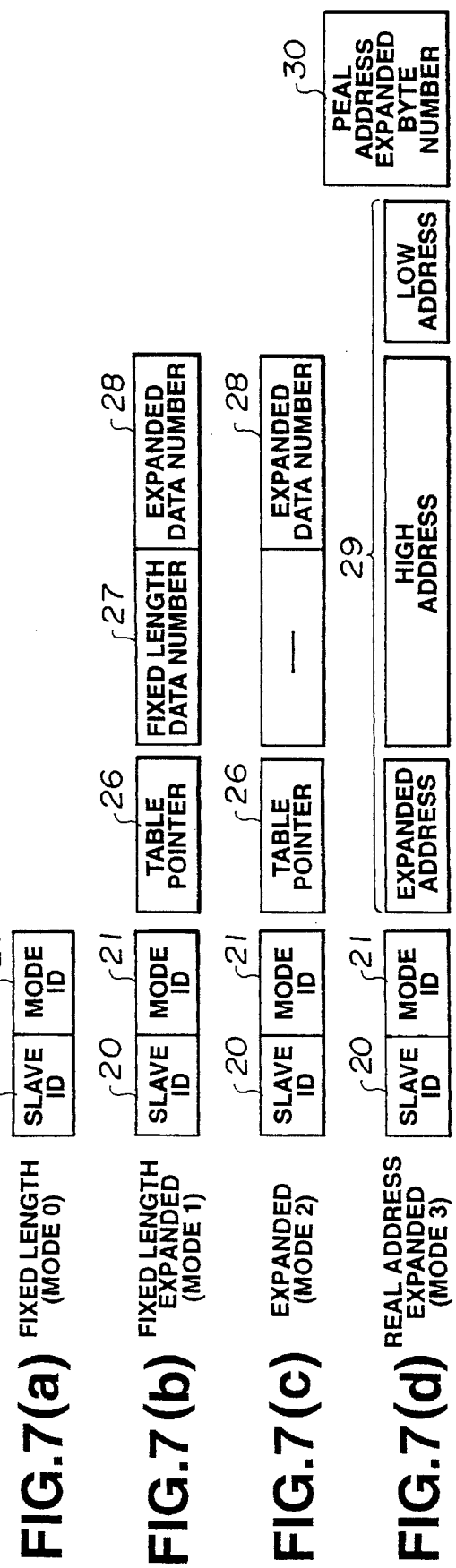

DATA COLLECTION SYSTEM FOR DRIVING MACHINE

BACKGROUND OF THE INVENTION

1. Field of the Invention

The present invention relates to a system which collects data acquired at a plurality of controllers disposed within such a construction machine as a driving machine to carry out predetermined processing operation, e.g., fault diagnosis.

2. Description of the Related Art

Conventionally, the fault diagnosis of a construction machine has been carried out in the following manner. That is, a service person goes out to a working site, performs incidental works such as removing of exterior members of the construction machine to conduct inspections over various sensors disposed therein including electric conduction test. Then, on the basis of inspection results, the service person judges a location and a cause of faults through his experiences and knowledge while referring to a repair manual.

However, since the construction machine has, in addition to a running function, working functions, the machine has a large number of parts and correspondingly much possible fault generation locations when compared to a general automobile. In addition, as found in a recent hydraulic shoveling machine, the machine has been equipped with mechatronics and correspondingly the structure of the machine has been complicated, thus increasing the number of possible fault generation locations. For this reason, the number of inspection locations is increased and thus a long time is required for the inspection. The fault diagnosis also involves troublesome incidental works such as the aforementioned removal of the exterior member of the vehicle.

Accordingly, a lot of time is required before the final fault diagnosis, which results in that the user must inevitably stop his work during the inspection time and its workability is remarkably deteriorated.

SUMMARY OF THE INVENTION

In view of such circumstances, it is an object of the present invention to provide a system for a driving machine which can quickly collect an enormous amount of data acquired at controllers disposed within the driving machine merely through such a simple work as to connect an external controller to a connector provided to the driving machine, and, with use of the data for fault diagnosing operation, which can allow a service person to quickly and simply perform the fault diagnosing works.

In accordance with an aspect of the present invention, there is provided a data collection system for a driving machine wherein a plurality of controllers for controlling driving of the driving machine are disposed within the driving machine to collect data obtained at each controller and to perform predetermined operation, the plurality of controllers are interconnected for mutual communication therebetween by means of a communication line, a connector for connection with an external controller disposed externally of the driving machine for the mutual communication is provided on the communication line between the external controller and the plurality of controllers, one of the plurality of controllers is used as a master controller to perform sequential polling operation over the other controllers including the external controller through the communication line while the other controller subjected to the polling transmits data obtained at its own controller to the controllers other than its own controller, the master controller, when receiving a response to the polling from the external controller, judges that the external controller is connected to the connector and stops the polling operation, and the external controller responded to the polling, after responding to the master controller, performs sequential polling operation over the other controllers, collects data obtained at the other controllers, and performs the predetermined operation in place of the master controller.

With such an arrangement, one of the plurality of controllers is used as the master controller to perform sequential polling operation over the other controllers including the external controller through the communication line. The other controller subjected to the polling transmits data obtained at its own controller to the controllers other than its own controller. The master controller continues its polling operation so long as the master controller fails to receive a response to the polling from the external controller.

However, the master controller, when receiving the response to the polling from the external controller, judges that the external controller is connected to a connector for connection with the external controllers and stops its polling operation. The external controller responded to the polling, after responding to the polling, performs sequential polling operation over the other controllers and collects data obtained at the other controllers in place of the master controller.

In this way, an enormous amount of data can be quickly collected through the controllers disposed within the driving machine only by connecting the external controller merely to the connector provided to the driving machine, and such predetermined operation as fault diagnosis can be simply and quickly carried out.

BRIEF DESCRIPTION OF THE DRAWINGS

FIGS. 6(a) and 6(b) are diagrams for explaining protocols of frame signals employed in the communication of the embodiment; and FIGS. 7(a) to 7(d) are diagrams for explaining a protocol of polling signals of the frame signals in FIGS. 6(a) and 6(b).

DESCRIPTION OF THE PREFERRED EMBODIMENTS

A data collection system for a driving machine in accordance with an embodiment of the present invention will be explained with reference to the attached drawings.

Figure 1:
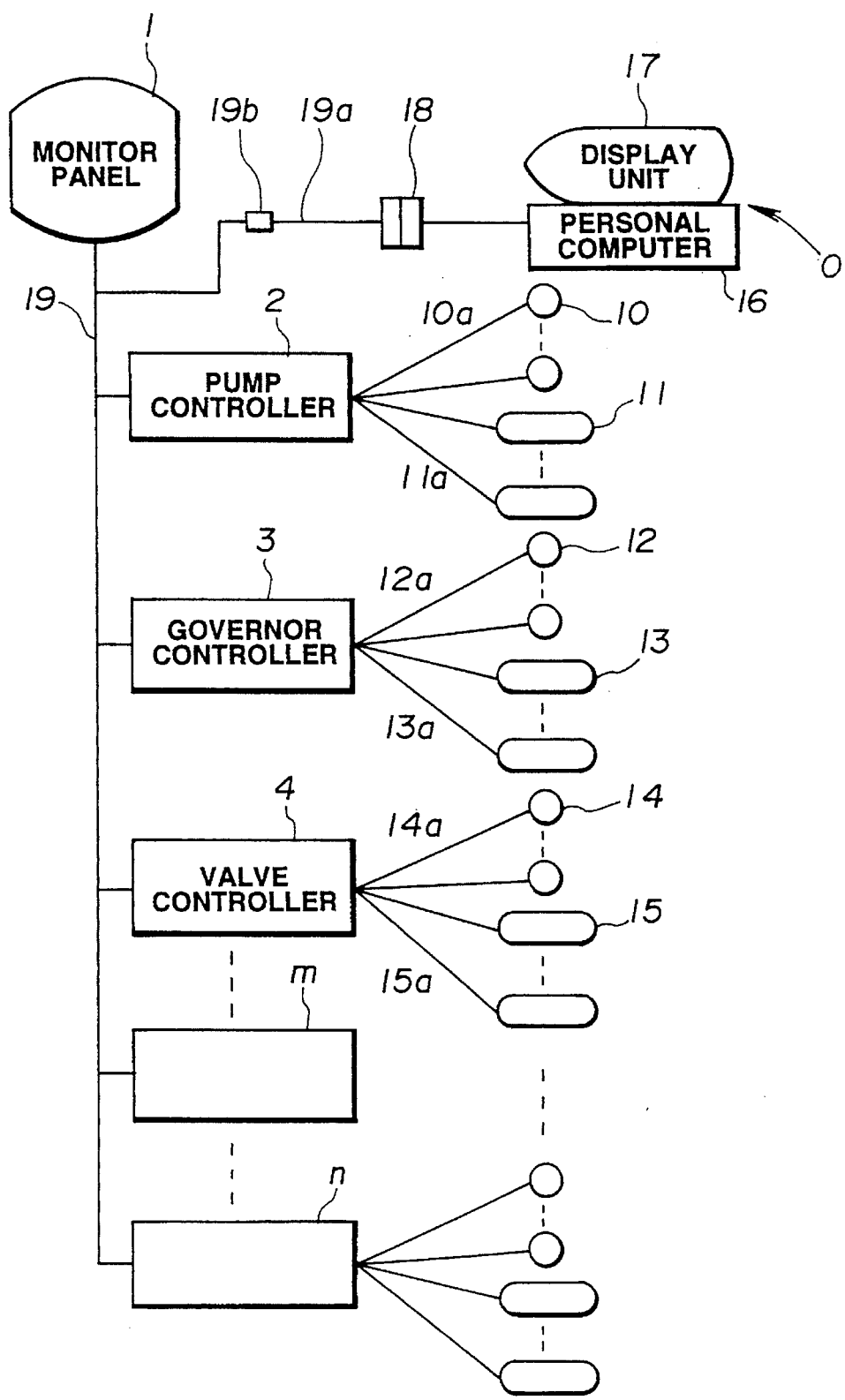
FIG. 1 is a block diagram of an arrangement of a data collection system for a driving machine in accordance with an embodiment of the present invention.

Referring now to FIG. 1, there is shown a block diagram of an arrangement of the embodiment system, in which case it is intended that a hydraulic shoveling machine is used as the driving machine and the system collects data acquired at a plurality of controllers disposed within the hydraulic shoveling machine.

As shown in the drawing, a plurality of controllers 1, 2, 3 and 4 are mounted to the hydraulic shoveling machine. The shoveling machine may be mounted, in addition to the controllers 1 to 4, with any number of controllers m (5, 6, . . . n−1), n as necessary.

More in detail, the controller 2 is a pump controller for receiving a manipulation amount, etc. of an operating lever and controlling a swash plate of a hydraulic pump according to the received manipulation amount. That is, the controller 2 outputs driving signals 11a, . . . to a plurality of actuators 11, . . . which drive the swash plate of the pump. The pump controller 2 also receives detection signals 10a, . . . from a plurality of sensors 10, . . . such as hydraulic sensors provided in a hydraulic circuit. The pump controller 2 stores, as control data, the received detection signals 10a, . . . and the driving signals 11a outputted to the respective actuators 11, . . . . The pump controller 2 also creates fault data (error data) indicative of faults in parts controlled by the pump controller 2 on the basis of the stored control data, signals received from manipulated switches and the manipulated amounts of the operating levers, and stores them as fault data.

The controller 3 is a governor controller 3 for controlling a governor in response to a manipulation amount in an operating lever. The governor controller 3 outputs driving signals 13a, . . . to a plurality of actuators 13, . . . such as governor motors. The governor controller 3 receives detection signals 12a, . . . from a plurality of such sensors 12, . . . as engine rotational sensors for detecting the rotational speed of the engine. The governor controller 3 also stores, as control data, the received detection signals 12a, . . . and the driving signals 13a, . . . to be outputted. Further, the governor controller 3 creates fault data indicative of faults in parts controlled by the governor controller 3 on the basis of the stored control data and the manipulation amounts of operating levers, and stores them as fault data.

The controller 4 is a valve controller 4 for controlling control valves disposed in a hydraulic pipe circuit between hydraulic pumps and such hydraulic actuators as boom cylinders. The valve controller 4 outputs driving signals 15a, . . . to a plurality of such actuators 15, . . . as solenoids provided to control values. The valve controller 4 receives detection signals 14a, . . . from a plurality of such sensors 14, . . . as hydraulic sensors provided in the hydraulic circuit. The valve controller 4 also stores, as control data, the received detection signals 14a, . . . and the driving signals 15a, . . . to be outputted. Further, the valve controller 4 creates fault data indicative of faults in parts controlled by the valve controller 4 on the basis of the stored control data, manipulated positions of switches and the manipulation amounts of operating levers, and stores them as fault data.

A controller 1 is a monitor panel 1 disposed in a driver's cab. The monitor controller 1 selectively instructs one of various sorts of controls through operator's switch manipulation according to one of various sorts of works to be carried out by the hydraulic shoveling machine, receives a detection signal from a fuel meter, and to control a display unit to cause information necessary for driving the machine and fault code information to be displayed on the liquid crystal display screen thereof.

The monitor controller 1, pump controller 2, governor controller 3 and valve controller 4 are interconnected for mutual communication by means of a signal line 19.

When an operator manipulates the monitor controller 1 and selects, for example, 'heavy excavation' as a working mode, the monitor panel 1 outputs a control signal to the respective controllers 2, 3 and 4 via the signal line 19 to provide an engine rotational speed and output torque corresponding to the 'heavy excavation' and to perform such a predetermined control as automatic deceleration function. The monitor panel 1 also receives the respective fault data from the controllers 2, 3 and 4 via the signal line 19, arranges these data on a time series basis, and stores the arranged data as a fault history.

Further, the monitor panel 1 stores its own fault data (error information) and also stores the working mode being currently selected and its own control signal to be outputted to the respective controllers 2, 3 and 4.

The signal line 19 is connected with another extension of signal line 19a for external connection. The signal line 19a has a connector 18 provided thereon for mutual connection between the external and internal controllers of the hydraulic shoveling machine. Provided on the extension signal line 19a is a signal converter 19b.

An external controller 0, which can be connected to the aforementioned connector 18, has a function of carrying out fault diagnosing operation over the hydraulic shoveling machine to be described later. More specifically, the external controller 0 is made up of a personal computer main body 16 and a display unit 17.

Explanation will now be made as to the mutual communication between the controllers 0, 1, 2, . . . Although the controllers m (5, 6, . . . ) and n may be additionally connected to the signal line 19 as mentioned above, it is assumed that these additional controllers are not connected in this case.

The aforementioned monitor panel 1, pump controller 2, governor controller 3, valve controllers m and n, and external controller 0 have their own code IDs for uniquely identifying the respective controllers. That is, the monitor panel 1, pump controller 2, governor controller 3, valve controllers m and n, and external controller 0 have code IDs '1', '2', '3', '4', 'm', 'n', and '0' respectively. And these controllers constitute a network and one of the controllers is used as a master controller and the other controllers are used as slave controllers to realize communication based on a so-called master/slave system. The 'master/slave system' as used therein refers to such a system that, as well known, a master controller calls or polls another slave controller, the polled slave controller transmits its own data therefrom based on a predetermined format, and the other controllers receive the data so as to carry out the communication.

When the external controller 0 is not connected to the signal line 19a for example, the monitor panel 1 having an ID of '1' is used as the master controller while the other controllers are used as the slave controllers.

For the communication, various sorts of systems may be employed, either case the system is based on such a format as shown in FIG. 6(a) and FIG. 6(b).

FIG. 6(a) shows a frame signal P issued from the master controller for polling. The frame signal P is made up of a slave ID part 20 as a header having an ID (0-N) of the slave controller as a polling party set therein, a mode ID part 21 following the slave ID part 20 and having an ID (0-3) for specifying one of communication modes, and a message part 22 following the mode ID part 21 and having various sorts of messages set therein (0-4 of data and usually 0 data).

Meanwhile, FIG. 6(b) shows a frame signal D issued from the controller which responded to the polling of the polled slave controller, a data part 23 (having 0-N of data) as a header having data such as the aforementioned fault data obtained at the controllers, a data part 24 following the data part 23 and having data for sum check, a code part DEND following the data part 24 indicative of an end of the data area, and a code part PAD following the DEND and indicative of the completion of the communication.

Employed as the communication mode in the master/slave system is any of a fixed-length area communication mode (communication mode 0), a combined communication mode (communication mode 1) corresponding to a combination of the fixed-length area communication and expanded area communication, an expanded area communication mode (communication mode 2), and a real address expanded area (communication mode 3). The 'fixed-length' as used herein a predetermined data length to be sent out from the controller subjected to the polling; whereas, the 'fixed-length area communication' means the communication that, when a slave controller is subjected to a polling operation, data in a predetermined fixed-length area in a memory table of the controller is transmitted to another controller, in which case the data of the message part 22 can be set to be zero.

Further, the word 'expanded area' refers to the area in which data other than data in the fixed-length area of the memory table is stored and which can be specified by designating with pointers. The word 'expanded area communication' means such communication that the polling of the specified pointer indicative of the expanded area is carried out to another controller, and the controller subjected to the polling transmits the expanded area data to another controller.

The word 'combined communication' means such communication that a master controller performs its polling operation with specified pointer indicative of an expanded area and the controller subjected to the polling transmits the data in the expanded area to another controller together with data in the predetermined fixed-length area of the memory table.

When the fixed-length area communication of the communication mode 0 is employed, such a frame signal P having no message part 22 as shown in FIG. 7(a) is sent from the master controller. When the combined communication of the communication mode 1 corresponding to a combination of the fixed-length area communication and expanded area communication, the message part 22 of the frame signal P is made up of a table pointer part 26 indicative of a pointer of the data table, a fixed-length data number part 27 following the table pointer part 26 and indicative of the number of fixed-length data, and an expanded data number part 28 following the fixed-length data number part 27 and indicative of the number of expanded data.

When the expanded area communication of the communication mode 2 is employed, the message part 22 is made up of the table pointer part 26 and the expanded data number part 28 following the table pointer part 26 and partly indicative of the number of expanded data as shown in FIG. 7(c).

When a real address expanded communication of the communication mode 3 is employed, the message part 22 is made up of an address part 29 indicative of various addresses and a real address expanded byte number part 30 following the address part 29 and indicative of the real address expanded byte number, as shown in FIG. 7(d).

Explanation will next be made as to the communication procedure.

* When the External Controller 0 Is Not Connected to the Connector 18:

1) First, when the a vehicle key for activating the power shoveling machine is turned to a position 'ACC' to supply power to the respective controllers 1, 2, . . . , all the controllers including the monitor panel 1 perform predetermined network initializing operation. The monitor panel 1 having the ID of '1' is started as a master controller and sends dummy data to the communication line 19 to establish communication synchronism.

2) Next, the monitor panel 1 sends to the communication line 19 the frame signal P having an ID of '1', i.e., for its own polling, that is, the frame signal P having the slave ID part 20 of the ID of '1' as its contents.

3) The monitor panel 1, when receiving the frame signal P, sends the frame signal D to the communication line 19 on every byte basis. The other controllers 2, 3 and 4 having IDs other than '1' receive the frame signal D through interruption. Meanwhile, the monitor panel 1 sequentially sends one byte of the frame signal D each time the panel 1 receives the frame signal D issued from its own through the interruption. In this way, the frame signal D having the number of bytes required by the polling is sent from the monitor panel 1. In this case, the reception interruption of the frame signal D issued for every byte enables realization of synchronism of all the controllers.

Thus, the monitor panel 1 sends its own data to the communication line 19 through its own polling and all the slave controllers 2, 3 and 4 connected to the communication line 19 receive the data. For this reason, as mentioned above, the monitor panel 1 can transmit a control signal corresponding to a working mode selected by the monitor panel 1, e.g., corresponding to the 'heavy excavation' as the frame signal D to the respective controllers 2, 3 and 4 through the communication line 19, whereby the respective controllers 2, 3 and 4 can perform controlling operation according to the above frame signal D.

4) Next, the monitor panel 1 sends to the communication line 19 the frame signal P to poll the pump controller 2 having an ID of '2', that is, the frame signal P having the slave ID part 20 of an ID of '2' as its contents.

5) The pump controller 2, after receiving the frame signal P, then transmits the frame signal D on every byte basis. The other slave controllers 3 and 4 and the master controller 1 having IDs other than '2' receives the frame signal D through interruption. Meanwhile, the pump controller 2, each time the controller 2 receives the frame signal D issued from its own through the interruption, sequentially sends the next one byte of the frame signal D. In this way, the frame signal D corresponding to the number of bytes required by the polling is sent from the pump controller 2.

6) Subsequently, the monitor panel 1 performs its polling operation over the governor controller 3 having an ID of '3', performs its polling operation over the valve controller 4 having an ID of '4' to cause the data issued from the governor controller 3 to be received at another controller, and performs the similar operation to the above 4) and 5) to cause the data issued from the valve controller 4 to be received at another controller.

In this way, the monitor panel 1 performs its polling operation over the other controllers 2, 3 and 4, such that the monitor panel 1 can accept the data from the polled controllers, and the slave controllers other than the polled controller can accept the data from the polled controller.

For this reason, the operator can confirm, in the monitor panel 1, the fault data (error information) of the respective controllers 2, 3 and 4 and the monitor panel 1 can arrange these fault data on a time series basis and store them as a fault history, as mentioned above. Further, the operator confirm the control data of the respective controllers 2, 3 and 4 on the monitor panel 1.

7) After performing the sequential polling operation over the controllers 2, 3 and 4 connected to the communication line 19 as mentioned above, the monitor panel 1 perform polling operation over the controllers 0, m, and n which are not connected yet.

That is, the monitor panel 1 next transmits to the communication line 19 the frame signal P for polling the external controller 0 having an ID of '0', i.e., the frame signal P whose slave ID part 20 has an ID of '0' as its contents.

8) Since the external controller 0 is not connected to the communication line 19 (extended communication line 19a), the external controller 0 cannot respond to the frame signal P. Thus, the master controller 1, when performing the polling operation over the external controller 0 and receiving no response after passage of a predetermined time, proceeds to the next processing operation.

9) That is, the master controller 1, when receiving no response from the external controller 0, shifts its procedure again to the above 2) to respectively execute the operations 2) to 6) similarly over the connected controllers.

10) Next, the monitor panel 1 transmits to the communication line 19 the frame signal P for polling the internal controller not connected to the communication line, i.e., the controller m having an ID of 'm', that is, the frame signal P whose slave ID part 20 has an ID of 'm' as its contents.

11) Since the controller m is not connected to the communication line 19, the controller cannot respond to the frame signal P. Thus, the master controller 1, when performing its polling operation over the controller m and receiving no response after elapse of a predetermined time, proceeds to the next operation.

12) That is, when the monitor panel 1, when receiving no response from the controller m, shifts its procedure again to the above operation 2) to respectively execute the above operations 2) to 6) similarly.

13) Similarly, the monitor panel 1 performs the polling operation over other not-connected controllers up to the last not-connected controller n, as in the above 10), 11) and 12).

When the controllers m and n, which have not been connected so far, are connected, that is, when the monitor panel 1 receives a response to its polling operation (transmission of the frame signal D), the monitor panel 1 recognizes the responded controllers m and n as connected controllers and after the controller 4, sequentially performs such a series of operations 2) to 6) as mentioned above over the connected controllers.

Meanwhile, if any of the controllers 2, 3 and 4 being currently connected may be disconnected from the signal line 19 due to the disconnection of its connector from the line, then the monitor panel 1 can receive no response. In this case, the monitor panel 1 recognizes the no-response controller 2, 3 or 4 as a not-connected controller and performs such a series of operations 7) to 12) as mentioned above over the not-connected controller 2, 3 or 4.

\* When the External Controller 0 Is Connected to the Connector 18:

So long as the monitor panel 1 fails to receive a response to its polling from the external controller 0, the monitor panel 1 continually performs the above operations 1) to 13) as the master controller, as already explained above.

14) However, when receiving a response to the polling from the external controller 0, that is, when receiving the frame signal D issued from the external controller 0, the monitor panel 1 judges that the external controller 0 was connected to the connector 18 and stops its polling operation as the master controller. Thereafter, the monitor panel 1 functions as a slave controller. The response of the external controller 0 to the polling is carried out after the external controller 0 is connected to the signal line 19a and then the personal computer 16 is operated to issue an instruction indicative of 'communication start'.

Meanwhile, the external controller 0 responded to the polling, after transmitting the frame signal D, functions as the master slave in place of the monitor panel 1.

That is, the external controller 0 similarly performs the above operations 2) to 13) as the master controller.

15) In this case, the external controller 0 first transmits to the communication line 19 the frame signal P having an ID of '0' for its own polling, i.e., the frame signal P whose slave ID part 20 has an ID of '0' as its contents.

16) And the external controller 0, after receiving the frame signal P the frame signal P, transmits the frame signal D on every byte basis. The other controllers 1, 2, 3 and 4 other than the controller having an ID of '0' receive the frame signal D through interruption. Meanwhile, the external controller 0 sequentially transmits one byte of the frame signal D each time the controller 0 receives an interruption. In this way, the frame signal D corresponding to the number of bytes required by the polling is transmitted from the external controller 0.

In this way, when the external controller 0 polls its own, the external controller 0 can transmit its own command to the other slave controllers 1 to 4 including the monitor panel 1. For this reason, the external controller 0 can transmit the command to the respective controllers disposed within the power shoveling machine. However, the operations 15) and 16) are carried out when it is necessary for the respective controllers within the power shoveling machine to perform the control required by the external controller 0. So if these operations 15) and 16) are unnecessary, then they can be omitted and the next processing can be made started.

17) The external controller 0 transmits the frame signal P for polling the monitor panel 1 having an ID of '1', that is, the frame signal P whose slave ID part 20 has an ID of '1' as its contents.

18) The monitor panel 1, when receiving the frame signal P, transmits the frame signal D on every byte basis to the signal line 19. The slave controllers 2, 3 and 4 and master controller 0 other than the controller having an ID of '1' receive the frame signal D through interruption. Meanwhile, the monitor panel 1 sequentially transmits one byte of the frame signal D each time the monitor panel 1 receives an interruption. This results in that the frame signal D corresponding to the number of bytes required by the polling is transmitted from the monitor panel 1.

19) Thereinafter, the external controller 0 is used as the master controller and performs the above operations 4) to 6) to perform the polling operation over the controllers 2, 3 and 4 connected to the communication line 19.

Since the external controller 0 perform the polling operation over the other controllers 1, 2, 3 and 4, the external controller 0 can accept data from the polled controller and the slave controllers other than the polled controller can also accept data from the polled controller.

For this reason, the external controller 0 can collect the faulty data (error information) of the respective controllers 1, 2, 3 and 4 within the power shoveling machine, fault history data, the working mode currently being selected by the monitor panel 1, dada indicative of the control data being outputted, and the control data of the respective controllers 2, 3 and 4; and can quickly perform its fault diagnosing operation on the basis of these data, which will be described later.

In this way, the external controller 0 perform its sequential polling operation over the controllers 1, 2, 3 and 4 connected to the communication line 19 and then performs its polling operation over the no-connected controllers m and n.

20) That is, the external controller 0 transmits to the communication line 19 the frame signal P for polling the not-connected internal controller, i.e., the controller m having an ID of 'm', that is, the frame signal P whose slave ID part 20 has an ID of 'm' as its contents.

21) Now, since the controller m is not connected to the communication line 19, the controller m cannot respond to the frame signal P. Thus, the external controller 0 perform the polling operation over the controller m and when failing to receive its response after passage of a predetermined time, the controller 0 proceeds to the next operation.

22) That is, when failing to a response from the controller m, the external controller 0 shifts its procedure again to the above operation 15) and respectively executes the similar operations 15) to 19).

23) The external controller 0 perform the polling operation over the other not-connected controllers up to the last controllers n to perform the above operations 20), 21) and 22).

Under the condition that the external controller 0 is now being used as the master controller, when it is desired for the monitor panel 1 to be used again as the master controller, a predetermined time T is previously set so that, in the absence of the polling from the external controller 0 even after the passage of the predetermined time T, the monitor panel 1 is set to again perform the polling operation. More specifically, the personal computer 16 is operated in such a manner as to be describe later so that, at the moment of the passage of the above predetermined time after issuance of an instruction of 'communication function end', the master controller is switched.

Figure 2:
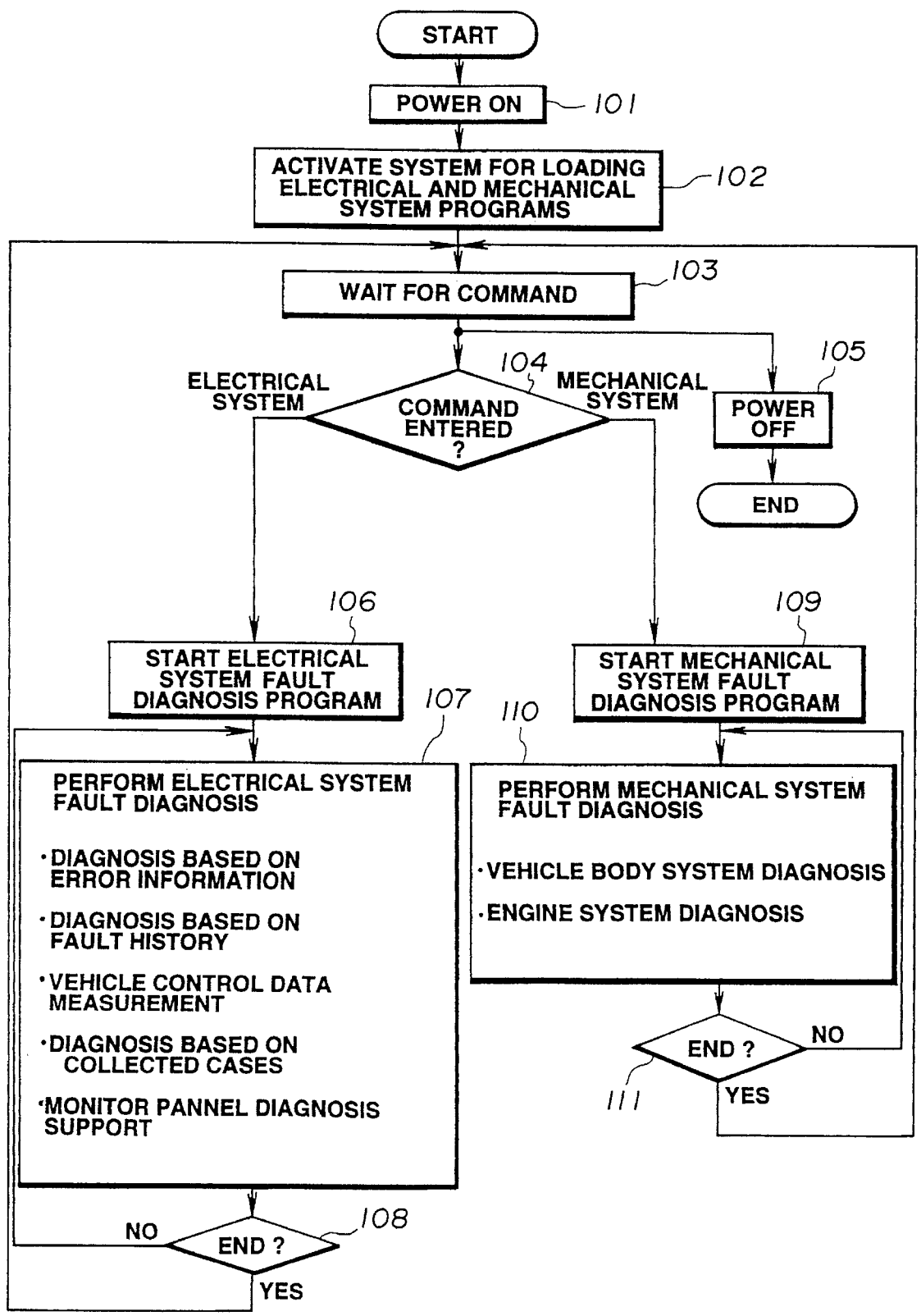
FIG. 2 is a flowchart for explaining the processing procedure of the embodiment carried out by an external controller.

Explanation will be made to the fault diagnosing operation based on the data collected by the external controller 0, by referring to a flowchart of FIG. 2 showing the operation of the personal computer 16 of the external controller 0.

That is, FIG. 2 shows the flowchart for explaining the operation of the personal computer 16.

As illustrated, the power source of the personal computer 16 is turned ON (step 101), and then an electrical system fault diagnosis program and a mechanical system fault diagnosis program are loaded to activate a fault diagnosis system. (step 102).

At this time, the system is put in its command input wait mode (step 103). When a command indicative of selection of an electrical system is entered, this causes activation of the electrical system fault diagnosis program including the communication operation of the above operations 15) to 23) (steps 104 and 106). Meanwhile, when a command indicative of selection of the mechanical system fault diagnosis program is entered, this causes activation of the mechanical system fault diagnosis program (steps 104 and 109). When the power source is turned OFF in the command input wait mode, the operation of the system is terminated (step 105).

When the electrical system fault diagnosis program is activated, various diagnoses of the electrical system including a 'diagnosis based on error information', a 'diagnosis based on a fault history', a 'vehicle control data measurement', a 'diagnosis based on collected cases' and 'monitor panel diagnosis support' are executed according to operator's selection (step 107), which will be detailed later. When the fault diagnosing operation of the electrical system is terminated (when the judgement of the step 108 is YES), the procedure is shifted again to the step 103 to put the system in the command input wait mode.

Meanwhile, when the mechanical system fault diagnosis program is activated, various diagnoses of the mechanical system including a 'vehicle body system diagnosis' and an 'engine system diagnosis' are executed according to operator's selection (step 110), which will be detailed later. When the fault diagnosing operation of the mechanical system is completed (when the judgement of the step 111 is YES), the procedure is shifted again to the step 103 to put the system in the command input wait mode.

Figure 3:
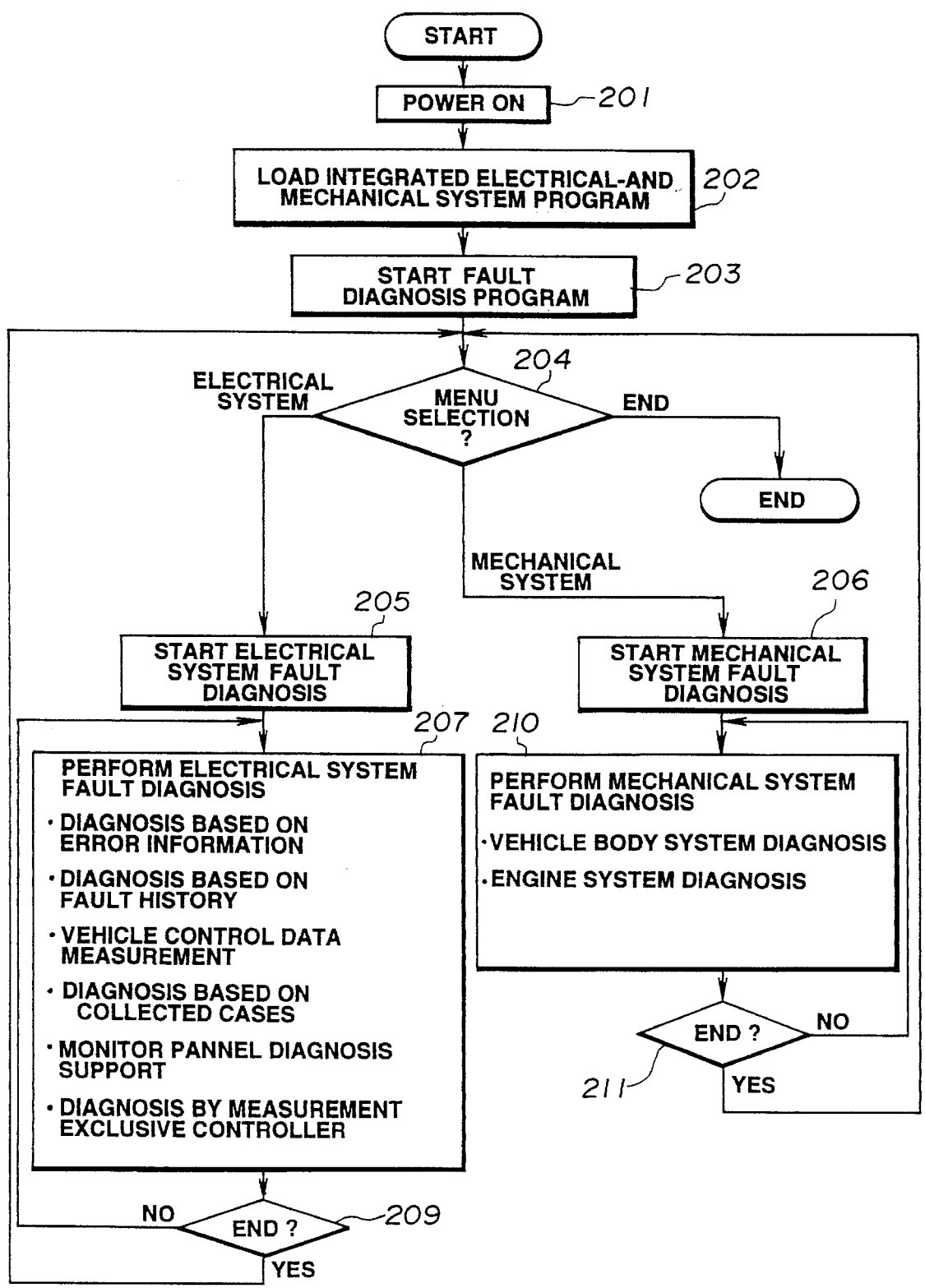
FIG. 3 is a flowchart for explaining another procedure of the embodiment carried out by the external controller, different from the procedure of FIG. 2.

In place of the operation of FIG. 2, the operation of FIG. 3 may be employed as necessary.

When the operation of FIG. 3 is employed, it becomes necessary to additionally provide the hydraulic shoveling machine to such a measurement exclusive controller as to be explained below.

More in detail, a measurement exclusive controller 5 is connected to the signal line 19 to act to receive detection signals from various sorts of sensors for detection of engine blow-by pressure, pressures at various points in the hydraulic circuit, etc. Thus, when the controller 5 performs the aforementioned communication operation. the controller functions as a slave controller. Stored in a memory of the controller 5 are various measuring conditions in the form of a table, so that, when the controller 5 receives such a command from the external controller 0 as explained in the above operations 15) and 16), predetermined one of the measuring conditions corresponding to the received command is selected from the table and the controller 5 transmits measuring data under the selected condition to the external controller 0.

When the power source of the personal computer 16 is turned ON under such an assumption (step 201), the fault diagnosis program corresponding to an integration of the electrical system fault diagnosis program and the mechanical system fault diagnosis program is loaded to be activated (steps 202 and 203).

And when the system is put in the command input wait mode on a program selection menu (step 204) and when the 'electrical system diagnosis' is selected as a selected menu, the fault diagnosing operation of the electrical system including the communication operation of the above operations 15) to 23) is started (step 205). Meanwhile, when the 'mechanical system diagnosis' is selected, the fault diagnosing operation of the mechanical system is started (step 206). Selection of 'end' on the menu causes the processing to be terminated.

When the fault diagnosis operation of the electrical system is started, various diagnoses of the electrical system including the 'diagnosis based on error information', 'diagnosis based on a fault history', 'vehicle control data measurement', 'diagnosis based on collected cases' and 'monitor panel diagnosis support' are executed according to operator's selection and diagnosing operation is carried out on the basis of the measured data collected by the measurement exclusive controller 5, as in the step 107. In this case, measured data is compared with a reference value to obtain a difference therebetween and the degree of abnormality in an object under measurement is judged according to the comparison difference (step 207). When the fault diagnosing operation of the electrical system is completed (when the judgement of the step 209 is YES), the procedure is shifted again to the step 204 to put the system in a selected-menu input wait mode.

Meanwhile, when the 'mechanical system fault diagnosis' is selected, the fault diagnosing operation of the mechanical system is started (step 206), the diagnosing operation of the mechanical system, i.e., the 'vehicle body system diagnosis' and 'engine system diagnosis' are executed according to operator's selection as in the above step 110, a command is issued to the measurement exclusive controller 5 as necessary, and diagnosis is carried out on the basis of the measured data collected by the controller 5. In this case, the measured data is compared with a reference value to obtain a difference therebetween, the degree of abnormality in an object under measurement is judged according to the comparison difference (step 210). When the fault diagnosing operation of the mechanical system is completed (when the judgement of the step 211 is YES), the procedure is shifted again to the step 204 to put the system in the selected-menu input wait mode.

Figure 4:
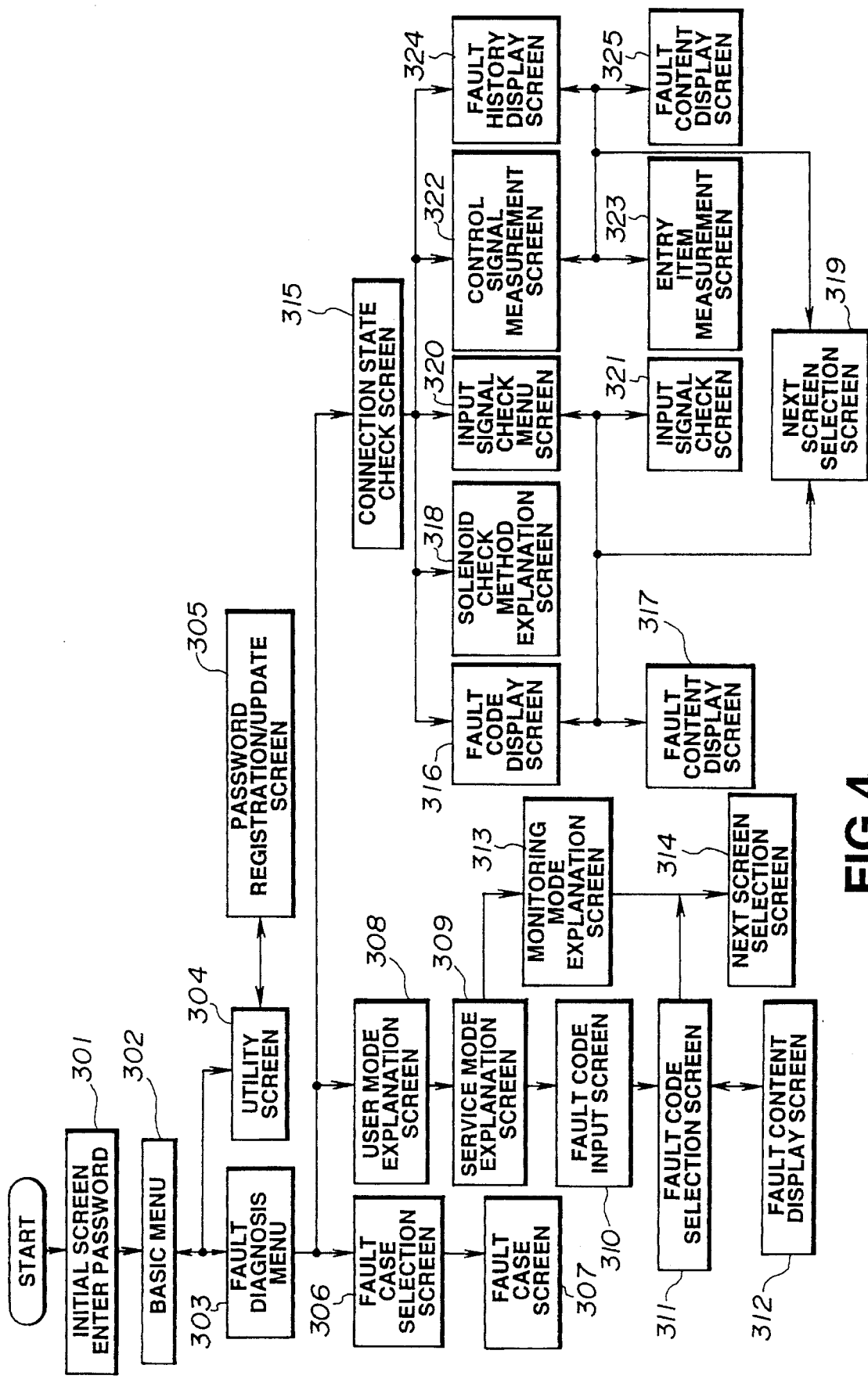
FIG. 4 is a flowchart showing, as an example, the fault diagnosis procedure of an electrical system in FIG. 2 or 3.

FIG. 4 is a flowchart for explaining the fault diagnosing operation of the electrical system. When the electrical system fault diagnosis program is activated in the step 106 of FIG. 2 or when the fault diagnosing operation of the electrical system is started in the step 205 of FIG. 3, the operation of FIG. 4 is started.

That is, the processing is proceeded in an interactive manner with the screen of the display unit 17. More in detail, when the user enters a password on the initial screen (step 301), this causes appearance of a basic menu on the screen (step 302). In the flowchart of FIG. 3, such a password may be entered in the step 203.

Either one of a fault diagnosis menu and a utility is selected on the basic menu. When the user selects the utility, this causes appearance of a utility screen (step 304) and the utility screen may be switched as necessary to a screen for password registration or modification (step 305). A function of maintaining such a data file as a reference value data case collection may be arranged to be selected in the step 304 as required.

When the fault diagnosis menu is selected, a fault diagnosis menu appears on the screen to select either one of the 'communication function', 'diagnosis based on the past case data collection', and 'monitor panel diagnosis support' (step 303).

When the 'communication function' is now selected, a command indicative of 'communication start' is issued through the signal lines 19 and 19a so that the external controller 0 responds to the polling from the monitor panel 1, after which the external controller 0 functions as the master controller and collects data on the controllers 1 to 4 disposed within the hydraulic shoveling machine.

In order to establish the normal communication, the respective controllers 1 to 4 must be reliably connected to the signal line 19. To this end, the screen can be switched to a connection-state check screen, on which such connection states between the respective controllers and the signal line as, for example, 'monitor panel OK, pump controller OK, governor controller OK, valve controller NG' are displayed on the basis of the state of the frame signal D received from the respective controllers 1 to 4. Also displayed on the same screen are a code indicative of the type of the hydraulic shoveling machine and the versions of the programs used in the respective controllers 1 to 4 (step 315). The system may collate the displayed machine type code with the application types of the diagnosis programs to find an coincidence diagnosis program and to automatically execute it.

If the 'valve controller NG' indicative of an abnormal value is displayed, then its countermeasure method will be displayed. When it is confirmed that the connection states of all the controllers are normal, the system shifts the current screen to a screen for selection of various diagnosis works based on the communication function to select either one of the 'diagnosis based on error information', 'diagnosis based on fault history' and 'diagnosis based on vehicle control data'.

When the 'diagnosis based on error information' is selected, this causes appearance of a fault code display screen (step 316), in which diagnosis is carried out based on the fault data (error information) collected by the controllers 1 to 4. That is, the collected fault data are decoded so that a display, for example, 'fault code E231 (short-circuited solenoid of the TVC value' appears on the fault code display screen. If the service man selects the fault code on the fault code display screen, then a diagnosis procedure corresponding to 'fault contents: short-circuited solenoid of the TVC valve' is displayed on a fault contents display screen (step 317). And the service man conducts the diagnosis according to the displayed diagnosis procedure, which results in that the final diagnosis result and its countermeasure are displayed in the form of such information, e.g., that 'faulty solenoid of the TVC valve; replace: part number 123-456-7890; remove the right backward cover from the vehicle body and also remove the solenoid from the top of the hydraulic pump for replacement' and the faulty part is determined.

In this connection, if desired, the service man can switch the current screen to a screen for explanation of how to check the presence or absence of a solenoid fault generation (step 318).

When the user selects a control signal measurement screen (step 322) for the purpose of conducting the 'diagnosis based on vehicle control data', the diagnosis is carried out on the basis of the control data collected by the controllers 1 to 4. That is, the collected control data are decoded so that the detection values of the sensors and the command values for the actuators are displayed on the control signal measurement screen but separated into 6 screen zones. The user can selects one of the 6 zones and can display only desired control data in the selected screen zone on an entry item measurement screen (step 323). An entry item can be selected from all the 6 screens and the entry item measurement screen can also be displayed in the form of a single display screen.

Further, when an input signal check menu screen is selected (step 320), input signals can be displayed as classified and desired one of the classified input signals can be displayed on the input signal check screen (step 321).

When the 'diagnosis based on fault history' is selected, this causes appearance of a fault history display screen (step 324) to carry out the diagnosing operation based on fault history data collected by the monitor panel 1. More specifically, the collected fault history data are decoded so that the histories of various types of faults are displayed, for example, as '100 hours elapsed after the short-circuiting of the solenoid of the TVC valve; 200 hours elapsed after breaking of the solenoid of the TVC value; ...'. In this case, a diagnosis procedure for the 'fault contents: short-circuited solenoid of the TVC valve' can also be displayed on the fault contents display screen (step 325).

Further, when the current screen is switched to the next-screen selection screen in the course of the operation of each diagnosis, shift to another diagnosing operation can be realized (step 319).

Though the diagnosis based on the communication function has been explained in the foregoing, when it is desired to perform diagnosing operation based on such a fault phenomenon that the controllers 1 to 4 cannot directly detect or based on past fault case data, the 'diagnosis based on past case data collection' is selected on the fault diagnosis menu (step 303) and thus the current screen is switched to a fault case selection screen (step 306). On the fault case selection screen, various sorts of fault phenomena including, e.g., 'all working machines: slow running and turning speeds' are displayed, so that the user can select one of the fault phenomena according to the current state. The selection causes change-over to a fault diagnosis screen corresponding to the selected fault phenomenon. The operator can conduct the diagnosing works according to the displayed fault diagnosis procedure and eventually can locate a faulty part.

When the 'monitor panel diagnosis support' is selected on the fault diagnosis menu (step 303), this causes change-over to a user mode explanation screen (step 308), so that the operator can execute the diagnosis based on the monitor panel with use of the personal computer.

When change-over is done to a service mode explanation screen (step 309), the user can switch the screen to either a fault code input screen (step 310) or a monitoring mode explanation screen (step 313).

The user can switch the fault code input screen to a fault code selection screen (step 311) and can also switch the fault code selection screen to a fault contents display screen (step 312) as necessary. Further, the user can switch the fault code selection screen to the monitoring mode explanation screen. It is also possible to switch the fault code selection screen or monitoring mode explanation screen to a next-screen selection screen (step 314).

Figure 5:
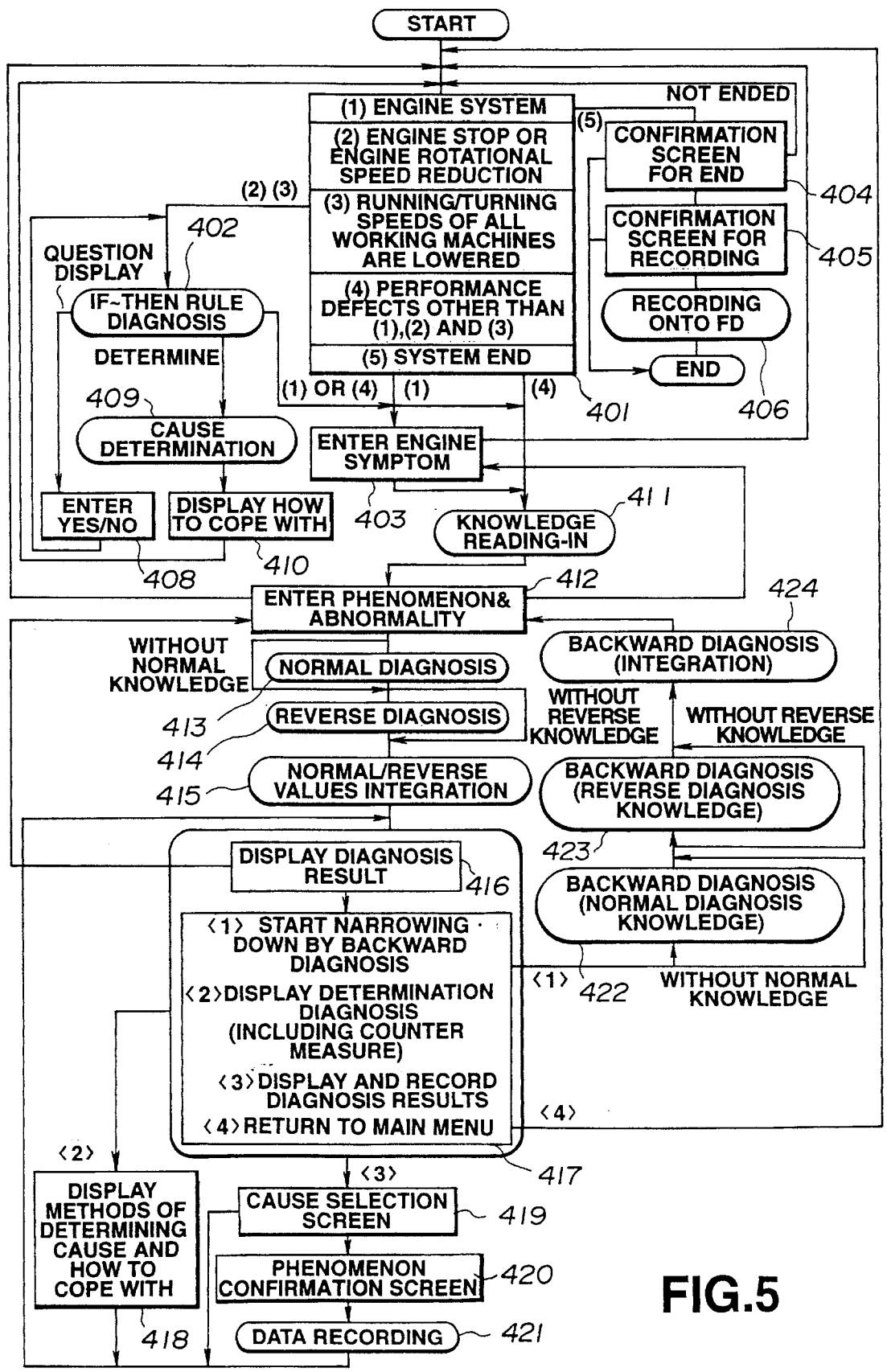
FIG. 5 is a flowchart showing, as an example, the fault diagnosis procedure of a mechanical system in FIG. 2 or 3.

Turning now to FIG. 5, there is shown a flowchart for explaining the fault diagnosing operation of the mechanical system. When the mechanical system fault diagnosis program is activated in the step 109 of FIG. 2 or when the fault diagnosing operation of the mechanical system is started in the step 206 of FIG. 3, the operation of FIG. 5 is started.

First of all, the main menu is displayed on the screen. That is, there appears on the screen roughly classified fault phenomena which follow.

(1) Engine system (2) Engine stop or engine rotational speed reduction (3) Running/turning speeds of all working machines are lowered (4) Performance defects other than (1), (2) and (3) and (5) System end (step 401).

For the system end (5), refer to a step 401.

When the system end (5) is selected, the current screen is switched to a ending confirmation screen (step 404) and then to a recording confirmation screen (step 405), data are memorized and stored in a floppy disk (step 406), thus terminating the operation. It is also possible not to terminate the system on the ending confirmation screen, in which case the screen is switched again to the main menu screen of the step 401.

When the above engine system (1) is selected in the main menu, engine symptoms, e.g., 16 symptoms are displayed on the screen and the user can select one of the 16 symptoms corresponding to the current faulty phenomenon (step 403). And a knowledge (normal or reverse diagnosis knowledge) necessary for the diagnosing operation of the engine system is read out from the memory (step 411).

In the main menu, when the user selects the item (4) corresponding to faulty phenomena other than those of the engine system, that is, corresponding to the faulty phenomena of the vehicle body system, a knowledge necessary for the fault diagnosis of the vehicle body system is read out from the memory in the step 411.

Meanwhile, when it is not clear whether the faulty phenomenon is present in the engine system or in the vehicle body system, the above item (2) or (3) in the main menu is selected, in which case the procedure is shifted to the step 402 to conduct the diagnosis based on a so-called if-then rule.

More specifically, question items are sequentially displayed on the screen so that, when the user sequentially pushes a key indicative of YES or NO for the displayed questions (step 408), a faulty cause is eventually displayed on the screen (step 409) and its countermeasure for the fault cause is displayed (step 410).

When the fault cause cannot be determined through the diagnosis based on the if-then rule, the faulty phenomenon is considered to belong to the item (1) or (4), and the procedure is shifted to the step 403 or 411.

When the normal or reverse diagnosis knowledge is read out, various faulty phenomena and abnormalities for these phenomena are entered through user's keying operation in order to conduct normal or reverse diagnosis.

More in detail, 10 steps of abnormalities 0 to 9 are entered with respect to such various phenomena, as phenomenon 1 (black exhaust gas color), phenomenon 2 (insufficient power), phenomenon 3 (gradually deteriorated), etc. (step 412).

Then the normal diagnosis is carried out on the basis of the entered normal diagnosis knowledge and abnormalities (step 413). The reverse diagnosis is carried out on the basis of the reverse diagnosis knowledge and abnormalities (step 414). Further, normal/reverse integration diagnosis corresponding to an integration of the normal and reverse diagnosis results is carried out (step 415).

The word 'normal diagnosis' as used herein refers to such diagnosis, as known, as to estimate a fault cause on the basis of normal diagnosis knowledge indicative of cause/effect relations (such as faulty phenomena, influence between fault causes, generation frequency, etc.) between various sorts of faulty phenomena and various sorts of fault causes and also on the basis of abnormalities indicative of frequencies of the current generations of these faulty phenomena. The normal diagnosis tends to be estimated higher in its reliability as the generation frequency of the fault cause is higher.

On the other hand, the word 'reverse diagnosis' as used herein refers to such diagnosis as to estimate a fault cause by comparing reverse diagnosis knowledge indicative of cause/effect relations (standard generation patterns of various sorts of faulty phenomena estimated from the fault causes) between various sorts of fault causes and various sorts of faulty phenomena with generation patterns (obtained from abnormalities) of various sorts of actually-occurred faulty phenomena. The reverse diagnosis tends to be estimated higher in its reliability as an actual generation pattern is more similar to the standard generation pattern.

When inference or reasoning is carried out based only on the above normal diagnosis operation, a fault cause having a high generation frequency can be effectively located. However, since the above inference does not consider such generation patterns of various sorts of phenomena as the reverse diagnosing operation, the normal diagnosis may fail to miss the important cause of a fault having a low generation frequency, thus leading to an erroneous diagnosis result.

Reversely, the inference based only on the above reverse diagnosing operation can avoid the missing of the cause of a fault having a low generation frequency because the reverse-diagnosis-based inference considers the generation patterns of various sorts of faulty phenomena. However, since the reverse-diagnosis inference does not consider the generation frequency of a faulty cause as in the normal diagnosing operation, which results in that the diagnosis result becomes erroneous.

To avoid this, predetermined weighting is carried out for each of the results of the normal and reverse diagnoses and an addition result indicative of addition of the weighted results is used as a final diagnosis result, which diagnosis is referred to as a normal/reverse integration diagnosis. The normal/reverse integration diagnosis can offer a less erroneous diagnosis result because the defects of both the normal and reverse diagnoses can be made up to some extent.

In the case of the absence of the normal diagnosis knowledge, only the reverse diagnosis may be carried out; whereas, in the case of the absence of the reverse diagnosis knowledge, only the normal diagnosis may be carried out.

When such diagnosis is completed, its diagnosis result is displayed on the screen (step 416). More specifically, certainties for various sorts of causes are displayed in its decreasing order, e.g., with such information that "cause 1: clogged air cleaner has a certainty of a %; cause 2: defective ejection nozzle has a certainty of b%; cause 3: defective battery has a certainty of c%, . . . ". And a menu for selection of various sorts of operations which follow is displayed (step 417).

<1>Start narrowing-down based on backward diagnosis

<2>Display determination diagnosis (including its countermeasure)

<3>Display and record diagnosis results

<4>Return to main menu

Selection of the above item <1> causes the backward diagnosis to be executed on the basis of the normal diagnosis knowledge (step 422), the backward diagnosis to be executed on the basis of the reverse diagnosis knowledge (step 423), the backward diagnosis corresponding to an integration of the normal and reverse diagnosis knowledge to be executed (step 424), and then the procedure is shifted again to the step 412.

In the absence of the normal diagnosis knowledge, the diagnosis based only on the reverse diagnosis knowledge may be carried out; whereas, in the absence of the reverse diagnosis knowledge, the diagnosis based only on the normal diagnosis knowledge may be carried out.

Selection of the above item <2> of "Display determination diagnosis (including its countermeasure)" causes appearance of a diagnosing procedure for determining the cause. The operator can finally determine the cause by proceeding its diagnosing operation with help of the displayed procedure. The countermeasure against the determined fault cause is also displayed (step 418).

When the operator selects the item <3> of the "Display and record diagnosis results", this causes the screen to be switched to a cause selection screen (step 419). When the operator selects desired one of the displayed fault causes, this causes the screen to be switched to a phenomenon confirmation screen (step 420) and its diagnosis result to be stored (step 421).

Selection of the above item <4> causes the procedure to be shifted again to the step 401 for selection of an new item in the main menu.

The aforementioned fault diagnosing operation has been explained merely as an example, and the operation of the external controller 0 based on the collected data of the controllers 1 to 4 of the hydraulic shoveling machine may be arbitrarily modified. Further, the application of the present invention is not restricted to the hydraulic shoveling machine and the invention can be arbitrarily applied to any machine so long as the machine is a driving machine having a plurality of controllers.

As has been explained in the foregoing, in accordance with the present invention, since an enormous amount of data can be quickly collected through the controllers disposed within the driving machine only by connecting the external controller merely to the connector provided to the driving machine, such predetermined operation as fault diagnosis can be simply and quickly carried out, service man's burden imposed on the data collecting works can be remarkably lightened, even an unexperienced service man can reliably conduct the diagnosing operation, and the shortened diagnosing time can lead to a remarkable improvement of the workability of the driving machine. Further, since data can be collected at one location, the data can be collectively saved and thus data analysis can be always easily executed.

What is claimed is:

1. A data collection system for a driving machine which includes a plurality of controllers for controlling driving of said driving machine disposed within the driving machine to collect data obtained at each controller and to perform predetermined operations, said data collection system comprising:

communication means comprised of said plurality controllers which are interconnected for mutual communication therebetween by means of a communication line, an external controller connection connector provided on the communication line for mutual communication between an external controller diposed externally of said driving machine and said plurality of controllers, first control means for controlling the operation of one master controller among the plurality of controllers to perform sequential polling operation over all of the controllers including said master controller and said external controller through said communication line, second control means for controlling the operation of one of the controllers which has received the polling from said master controller to transmit data obtained at said one of the controllers to the controllers other than said one of the controllers, third control means operative when said master controller receives a response to the polling from said external controller for judging that the external controller is connected to said connector and stopping the polling operation being performed by the master controller, fourth control means operative after the external controller responded to the polling from the master controller for controlling the operation of the external controller to perform a sequential polling operation over all of the controllers including the external controller and the master controller throuqh said communication line, fifth control means for controlling the operation of one of the controllers which has received the polling from the external controller to transmit data obtained at said one of the controllers to the controllers other than said one of the controllers, and sixth control means operative when data obtained at the controllers other than the external controller are collected at the external controller by the control of the fifth control means for controlling the operation of the external controller to perform the predetermined operations based on the collected data.

2. A data collection system for a driving machine as set forth in claim 1, wherein, when said external controller does not perform next polling operation even though a predetermined period of time has elapsed after the polling operation was performed, said first control means is activated to control the operation of said master controller to perform the polling operation.

3. A data collection system for a driving machine is set forth in claim 1, wherein said plurality of controllers include a measurement exclusive controller for measuring a driving state of said driving machine and wherein said sixth control means collects measured data obtained at said measurement exclusive controller and processes the collected measured data to judge an abnormality in the driving machine.

4. A data collection system for a driving machine as set forth in claim 1, wherein said driving machine is a hydraulic shoveling machine and said predetermined operations include fault diagnosing operation of said hydraulic shoveling machine.

5. A data collection system for a driving machine as set forth in claim 1, wherein said external controller is a personal computer.

6. A data collection system for a driving machine as set forth in claim 1, wherein said external controller is provided with a display unit for displaying a result of execution of said predetermined operations.

* * * * *